July 17, 1956  T. M. KNOWLAND ET AL  2,754,848
FIRE HOSE AND METHOD OF MAKING
Filed June 11, 1953
Fig. 1
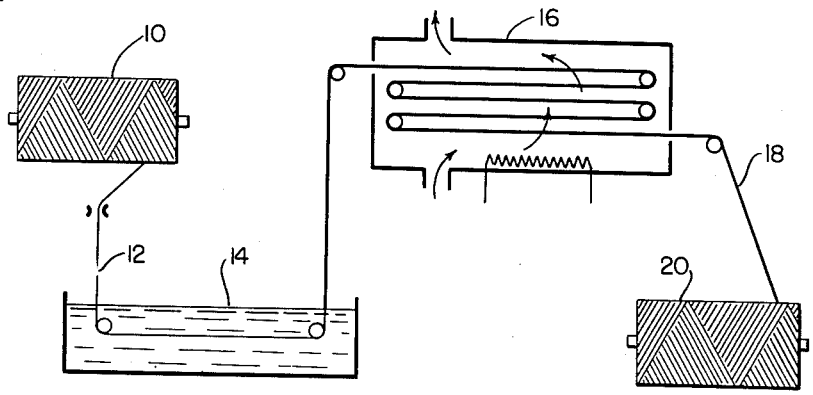
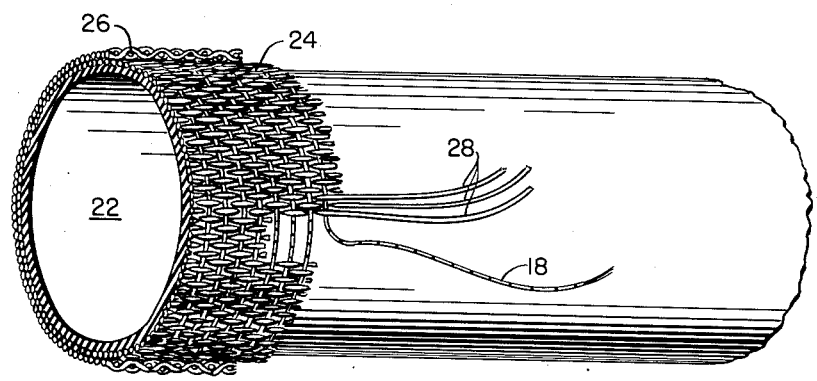
Fig. 2
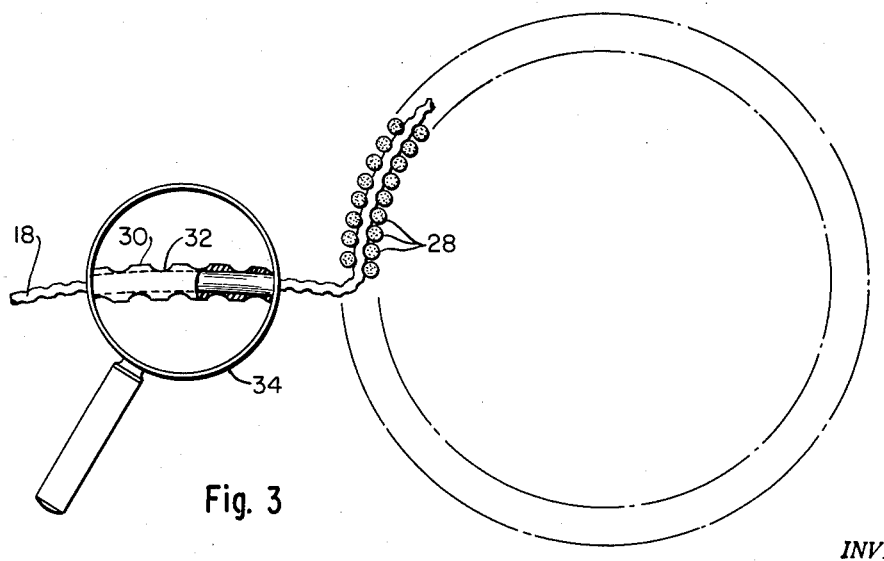
Fig. 3
INVENTORS
THOMAS M. KNOWLAND
RAYMOND S. CAMELIO
BY
Kenway, Jenney, Witter & Hildreth
ATTORNEYS

2,754,848

FIRE HOSE AND METHOD OF MAKING

Thomas M. Knowland, Belmont, and Raymond S. Camelio, Everett, Mass., assignors to Boston Woven Hose and Rubber Company, Cambridge, Mass., a corporation of Massachusetts Application June 11, 1953, Serial No. 361,036

3 Claims. (Cl. 138—55)

This invention relates to high pressure fire hose and particularly to a novel and improved hose of this type embodying protective coated glass filler threads producing a stronger and more durable hose and to the method of producing the hose. Fire hose is subjected not only to very high pressures but also to considerable rough handling and abuse and a primary object of our invention resides in the production of an improved hose particularly adapted to withstand such treatment.

Our improved hose embodies an inner tube of rubber or the like and one or more outer jackets sustaining and protecting the tube. In accordance with the invention the jacket construction includes glass yarn filler threads covered with a protective coating of thermoplastic composition and woven about the jacket together with suitable warp threads extending longitudinally of the jacket. Furthermore, a thermoplastic coated composition is selected and employed that is adapted to soften slightly at the temperature attained when vulcanizing the tube. The tube with the jacket in place thereon is vulcanized by steam therein at vulcanizing temperature and at a tube expanding pressure that causes the warp threads to become embedded into the softened coating on the glass yarn filler. Thus the filler yarn strands become so locked to the warp threads that they are firmly held in place and thereby give complete and permanent support to the tube. The production of this new and improved novel fire hose comprises the primary object of the invention.

These and other features of the invention will be best understood and appreciated from the following description of a preferred embodiment thereof selected for purposes of illustration and shown in the accompanying drawing in which—

Fig. 1 is a diagrammatic view illustrating the coating of glass filler yarn employed in our novel hose construction, Fig. 2 is a fragmentary view of a hose embodying the invention, and Fig. 3 is a fragmentary cross sectional view through the hose and illustrating the coated filler yarn in magnified view.

The glass yarn to be employed in our hose can be coated with the thermoplastic composition in a tubing machine or the coating can be applied in liquid form as a plasticol or organisol. We preferably employ a plasticized vinyl chloride or vinyl chloride acetate for coating the glass yarn, but such thermoplastics as polyvinyl alcohol or other comparatively soft thermoplastic materials can be used. The following represent suitable types of thermoplastics that can be employed. (1) Plasticized copolymers of vinyl acetate and vinyl chloride. (2) Plasticized vinyl chloride. The amount of plasticizer used with these plastic resins should be generally sufficient to yield a Shore durometer hardness of 55-65 at a temperature of 70° F.

In Fig. 1 we have illustrated a package 10 of glass yarn 12 to be employed in constructing our improved hose. The yarn is drawn from the package and passed through a coating bath 14 of the coating composition. The coated yarn is then passed through a drying oven 16 and from thence the completed yarn 18 is wound into a package 20.

Our novel high pressure hose comprises a rubber inner tube 22 together with one or more tubular woven jackets 24 and 26 on and supporting and protecting the tube. Each jacket comprises warp threads 28 extending longitudinally of the tube and into which the coated yarn 18 is woven as a filler extending about the jacket. The warp threads usually comprise cotton or synthetic fibres.

The glass yarn filler threads give great strength to the hose and the coating 30 protects the glass threads against chafing and other possible injury. The invention furthermore employs the coating to form a positive lock between the warp and filler threads at their intersections. The jacket or jackets are assembled on the tube 22 as illustrated in Fig. 2 and the tube is then vulcanized by steam under predetermined pressure and temperature within the tube and hose. Under these conditions, the heat of vulcanization which cures the rubber tube will also tend to soften the plastic coating 30 and a novel feature of the invention resides in selecting a coating plastic that is adapted to soften slightly at the vulcanizing temperature whereupon the outward steam vulcanizing pressure causes the warp threads 28 to indent themselves at 32 into the plastic coating 30. Thus the vulcanizing operation serves the additional function of providing a secure locking together of the warp and filler threads at their intersections. The vulcanizing operation furthermore bonds the rubber tube securely to the first jacket 24.

The selection of a suitable plastic is of considerable importance since the necessary indenting would not take place if the required softening temperature is too high and the plastic coating will melt and flow away from the yarn if the required softening temperature is too low. It will be apparent that when the indented coating has hardened at normal temperature the indentations 32 complement and hold the warp and filler threads firmly in place, thus giving full support and protection to the hose. In Fig. 3 the indented yarn is shown in magnified view under a glass 34 for purposes of disclosure.

It is particularly noted that the thermoplastic is carefully selected to have the characteristic of softening only slightly during the vulcanizing treatment, for reasons above described. Thus under the vulcanizing temperature and pressure the warp threads indent into the coating 30 and interlock with the filler threads without bonding adhesively thereto, and the loosely interlocked filler and warp threads provide a uniformly strong jacket for resisting high bursting pressures and a flexibility that permits free flexing of the hose.

Having thus disclosed our invention what we claim as new and desire to secure by Letters Patent is—

1. A fire hose comprising a rubber inner tube, and a woven jacket disposed on and bonded to the exterior surface of the tube, the jacket comprising glass yarn filler threads coated with a normally hard thermoplastic composition and extending helically about the tube and warp threads extending longitudinally of the tube and embedded within complementary indentations in said thermoplastic composition at the intersection of the warp and filler threads.

2. A tubular woven jacket for fire hose comprising glass yarn filler threads coated with a normally hard thermoplastic composition and extending helically about the tube and warp threads extending longitudinally of the tube and embedded within complementary indentations in said thermoplastic composition at the intersection of the warp and filler threads.

3. A method of making fire hose which consists in coating glass yarn with a thermoplastic composition adapted to soften slightly at a predetermined temperature, weaving warp threads and said yarn into a tubular body having said threads extending longitudinally thereof and the yarn woven thereinto and providing filler threads extending helically about the body, mounting the jacket on a rubber inner tube, and vulcanizing the tube by steam therein at said predetermined temperature and at a tube expanding pressure indenting the threads into said thermoplastic composition at the intersections of the warp and yarn.

References Cited in the file of this patent

UNITED STATES PATENTS

| | | |
|---|---|---|
| 2,009,075 | Thompson | July 23, 1935 |
| 2,184,326 | Thomas | Dec. 26, 1939 |
| 2,461,594 | Flounders | Feb. 15, 1949 |
| 2,690,769 | Brown | Oct. 5, 1954 |

FOREIGN PATENTS

| | | |
|---|---|---|
| 576,551 | Great Britain | Apr. 9, 1946 |
| 582,278 | Great Britain | Nov. 11, 1946 |